(12) United States Patent
Shiue et al.

(10) Patent No.: US 6,795,298 B2
(45) Date of Patent: Sep. 21, 2004

(54) FULLY AUTOMATIC AND ENERGY-EFFICIENT DEIONIZER

(75) Inventors: Lih-Ren Shiue, Hsinchu (TW); Abel Sun, Taipei (TW); Hsing-Chen Chung, Hsinchu (TW); Fei-Chen Hsieh, Taichung (TW); Yu-His Hsieh, Chunghua (TW); Ming-Liang Chiu, Changhua (TW); Ying-Jen Lai, Changhua (TW)

(73) Assignee: Luxon Energy Devices Corporation, Taipei (TW)

( * ) Notice: Subject to any disclaimer, the term of this patent is extended or adjusted under 35 U.S.C. 154(b) by 1 day.

(21) Appl. No.: 10/065,501

(22) Filed: Oct. 25, 2002

(65) Prior Publication Data

US 2003/0098266 A1 May 29, 2003

Related U.S. Application Data

(63) Continuation-in-part of application No. 09/948,852, filed on Jul. 9, 2001, now Pat. No. 6,462,935, and a continuation-in-part of application No. 10/109,825, filed on Mar. 27, 2002, now Pat. No. 6,580,598.

(51) Int. Cl.$^7$ ................................................. H01G 9/04
(52) U.S. Cl. ........................ 361/508; 361/528; 361/532
(58) Field of Search ................................. 361/502–503, 361/508–509, 511–512, 516, 528–529

(56) References Cited

U.S. PATENT DOCUMENTS

| | | |
|---|---|---|
| 3,515,664 A | 6/1970 | Johnson et al. ............. 204/301 |
| 3,658,674 A | 4/1972 | Benak .................... 204/180 R |
| 5,425,858 A * | 6/1995 | Farmer ....................... 204/450 |
| 5,514,269 A | 5/1996 | Day et al. ................... 204/660 |
| 5,766,442 A | 6/1998 | Bridger et al. .............. 205/318 |
| 6,022,436 A | 2/2000 | Koslow et al. ............. 156/191 |
| 6,325,907 B1 | 12/2001 | Andelman .................. 204/450 |
| 6,346,187 B1 | 2/2002 | Tran et al. .................. 205/342 |
| 6,410,128 B1 | 6/2002 | Calarco et al. .......... 428/313.9 |
| 6,413,409 B1 | 7/2002 | Otowa et al. ............... 205/748 |

* cited by examiner

*Primary Examiner*—Anthony Dinkins
(74) *Attorney, Agent, or Firm*—Jianq Chyun IP Office (57) ABSTRACT

A fully automatic deionizer comprising five sub-systems for removing ionic contaminants from various liquids at low energy consumption is devised. Based on the charging-discharging principle of capacitors, the deionizer conducts deionization through applying a low DC voltage to its electrodes for adsorbing ions, while more than 30% of the process energy is recovered and stored by discharging the electrodes. At the mean time of discharge, surface of the electrodes is regenerated on site and reset for performing many more cycles of deionization-regeneration till the desirable purification is attained. In one moment, both deionization and regeneration proceed simultaneously on different groups of electrode modules, and in the next moment the electrode modules quickly switch the two processes. Such swift reciprocating actions are engaged in synchronized coordination of sub-systems of electrode modules, energy management, fluid flow, and automatic control.

30 Claims, 4 Drawing Sheets

FULLY AUTOMATIC AND ENERGY-EFFICIENT DEIONIZER

CROSS REFERENCE TO RELATED APPLICATIONS

This application is a continuation-in-part of U.S. patent application Ser. No. 09/948,852, filed Jul. 9, 2001 now U.S. Pat. No. 6,462,935 and entitled "Replaceable Flow-Through Capacitors for Removing Charged Species from Liquids". The present application is also a continuation-in-part of U.S. patent application Ser. No. 10/109,825, filed Mar. 27, 2002 now U.S. Pat. No. 6,580,598 and entitled "Deionizers with Energy Recovery". Both prior applications are incorporated herein by reference.

BACKGROUND OF INVENTION

1. Field of Invention

This invention relates to an energy management and other automatic control systems employed in a deionizer system that can remove charged species from liquids automatically and continuously with recovery of the process energy. More specifically, this invention relates to ion removal systems using capacitive deionization (CDI) on a number of flow-through capacitors (FTCs) in conjunction with supercapacitors, ultracapacitors, or electric double layer capacitors as the energy-storage device for storing the electrical energy that is reclaimed during the regeneration of FTCs.

2. Description of Related Art

There are numerous pollutants of inorganic, organic, or biological nature in the contaminated liquids and waters. Many methodologies and techniques can be used to decontaminate the impure fluids, nevertheless, none of the methods is universal. Among the pollutants, charged species or ions are probably the most frequently occurring source of contamination. This is due to that the contaminants often dissolve as ions, or they are dissociated or hydrolyzed into ions in the liquids. In either case, the contaminants are described as total dissolved solids (TDS) measured in ppm (parts per million). It requires a special treatment other than a simple filtration to reduce the TDS to acceptable levels for use or discharge. No matter what method is adopted, it should fulfill the following requirements: 1) low cost, 2) high efficiency, 3) no secondary pollution, 4) robust, and 5) energy efficient, for a method to become a cutting-edge technique on purifying liquids.

Ion-exchange and reverse osmosis (RO) are presently two popular techniques utilized for the reduction of TDS. Before applications, ion-exchange resins must be pre-conditioned in chemicals such as strong acids or bases followed by rinsing with copious de-ionized water. Strong chemicals and high-quality water are also used to regenerate the resins. Regeneration of ion-exchange resins can only be repeated in a limited number of cycles as the resins are vulnerable to degradations. Therefore, ion-exchange method is wasteful in terms of consuming chemicals and water, and the process generates secondary pollutions during precondition and regeneration of the resins. Opposite to the natural migration of solvent in osmosis, pure solvent is transferred from the high concentration side to the dilute side through fine pores of RO membranes in RO operation. To counteract the osmotic pressure, which is existent in all solutions and increases with the concentration of solutions, RO requires the application of pressures on the RO membranes for extracting the pure solvent from solutions. Therefore, the process energy of RO is high, which is also aggravated by most liquid is not recovered, and pollutants are left behind making the original liquids more polluted. As the pores of RO membranes are so fine, for example, 0.5 µm, that they are prone to fouling, as a consequence, they rely on costly pre-treating setups for protection. Regeneration of the RO membranes is also wasteful by consuming chemicals and pure solvents without mentioning the generation of secondary pollution.

Since TDS is associated with charged species, electro-technology, especially capacitive deionization (CDI) is a more sensible method than ion exchange and RO on reducing the ionic wastes. CDI utilizes the configuration of capacitor, or a flow-through capacitor (FTC) to be specific, wherein an electrostatic field is built with the application of low DC voltages to the electrodes for adsorbing ions as the ion-containing liquids flow through the electric field. Electricity is used to modulate the removal of ions, or purification of liquids, containing many adjustable parameters that impart CDI considerable maneuver-abilities.

There are many CDI and FTC works granted in the US patent publications, some typical examples can be found in U.S. Pat. Nos. 3,515,664, 3,658,674, 5,425,858, 5,514,269, 5,766,442, 6,022,436, 6,325,907, 6,346,187, 6,410,428, and 6,413,409. They are all incorporated herein by reference. Though various fabrication methods of electrodes and electrode modules, as well as miscellaneous patterns of liquid-flow, are disclosed in the prior art, they are generally lack of an implementing methodology to become commercially viable on treating massive liquids. One of the miscomprehended arrangements of conducting CDI in the prior art is that the fundamental properties of capacitors, for example, fast charging and fast discharging, are overlooked. In essence, the adsorption of ions on the electrodes of CDI module is the same process as the charging of capacitors, while desorption of ions from the CDI electrodes is equivalent to the discharging of capacitors. As the charging and discharging of capacitor normally take place in a matter of seconds, as well as repeat in numerous cycles, the ion-adsorption and ion-desorption of CDI technique should be conducted swiftly without unduly delay. Furthermore, energy is harvested at capacitor discharging because that is the reason that energy is invested at charging. Thence, energy can be reclaimed as a by-product at the regeneration of the CDI electrodes. Unlike ion-exchange and RO, no chemicals and pure solvents are consumed, nor secondary pollution is generated during the regeneration of CDI electrodes. It is due to that low process energy is used for deionization, energy is recovered at regeneration, and the foregoing processes are rapidly completed that transforms the CDI technique into a method of low cost and high productivity for environmental applications.

SUMMARY OF INVENTION

The present invention provides an implementing method of automatic CDI for commercially producing fresh water via desalination or recycling waste waters, for liquid waste reduction, and for other high value-added applications.

Both ion adsorption on the electrodes of CDI modules and regeneration of the CDI electrodes are fundamental physical processes in the nature. While the surface adsorption is due to electrostatic attraction, the electrode regeneration occurs by means of static-charge dissipation, just like the charging and discharging of capacitors, the two processes of CDI will respond promptly and reversibly to the external actuations. It is the intent of the present invention to devise a fully automatic system utilizing the foregoing physical processes for producing fresh water, pure solvents, and useful resources with a high energy-efficiency. In accordance with the present invention, one object is to use an economical material as the active adsorbent of ions. First of all, the material should be adsorptive, conductive and inert in adverse conditions such as strong acids, strong bases, strong oxidants, and organic solvents. Among many choices, activated carbons (ACs) are one ideal group for CDI applications. Unless added benefits to justify the extra efforts put on preparing extraordinary carbonaceous materials, otherwise, an inexpensive and commercially available AC is good enough for some CDI applications. Using conventional means, for example, roller coating, and with the assistance of a binder, powder of an ordinary activated carbon can be attached to a metallic support forming the electrodes of CDI.

Another object of the invention is to construct the electrode modules of CDI in a simple and effective assembly. All modules should allow free path to liquids as in regular FTCs. In order to attain high adsorption efficiency, all of the impure liquid must be subjected to the static electric field built within the electrode modules. This means that the fluid must pass between the charged electrodes and there is no bypath for the un-treated liquid to escape, as well as no concealment in the container of FTC for the liquid to remain un-treated. Thus, simple assemblies as normally used for capacitors, for example, spiral winding and parallel stacking, are adopted to make FTCs to fit into the housings of desirable shapes and dimensions in a liquid-treating system. To fit the shapes of various housings, the electrode module can be in the form of cylinder, cube, or rectangle. Hermetic sealing and flow guides are provided in the treating units comprised of FTCs and housings to ensure the requisite pattern of liquid flow.

Following the completion of CDI treating units, there should have an energy manager to govern the reciprocating deionization and regeneration, or charging and discharging, of the electrode modules for purifying liquids. It is yet another object of the invention to devise an energy management sub-system comprising of a DC power source, an energy-storage device, and a micro-controller that allows the settings of various durations for conducting either deionization or regeneration as desired. Electricity is supplied to the electrodes from the power source for deionization, whereas the residual energy of the electrodes is released to the storage device during regeneration. Both processes should be modulated to continue for appropriate durations without unduly delay. Also, the DC voltage is controlled at a level only to sustain an electric field for electrostatic attraction of ions, rather than causing electrochemical reactions.

Yet another object of the invention is to devise an automation sub-system comprising of a micro-controller, on-line sensors and electromagnetic fluid values. As the sensors detect the purity of effluent of a particular CDI treating unit below a predetermined level indicating the requirement of regeneration, upon a signal from the sensors, the controller will divert the flow-direction of electromagnetic valves so that the influent can be changed from liquid to be treated to the regeneration liquid. At the meantime, the electrode module will automatically be converted from deionization to regeneration, or from charging to discharging. All of the on-line monitoring, liquid-flow diversion, and energy transfer can be programmed to set up a desirable sequence of events, and as many cycling times of treatments as necessary without human attention.

Still another object of the invention is to devise a fully automatic CDI setup as a pre-treatment for the more expensive and fragile liquid-treating equipment such as ion-exchange and RO. CDI is capable of directly purifying high-concentration liquids such as seawater, so the TDS of liquids can be reduced to the suitable levels for ion exchange and RO that the service life of the latter can be prolonged. Because of the low cost of materials used, energy-efficiency of operation and pollution-free characteristics, the fully automatic CDI system of the invention can offer cross cutting benefits to the waste reduction of various liquids.

A further object of the invention is to devise a fully automatic CDI setup to recycle useful resources for reuse. During the regeneration of CDI electrode modules, a rinsing liquid is employed to transfer the desorbed ions, the ionic contaminants that are removed from the liquids at deionization, to a designated reservoir wherein useful resources can be concentrated and recovered. Not only the sludge from the purification treatment is easy for disposal, the present invention also provides values added to the reduction of liquid wastes by recycling useful resources for reuse in an economical fashion.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1A:
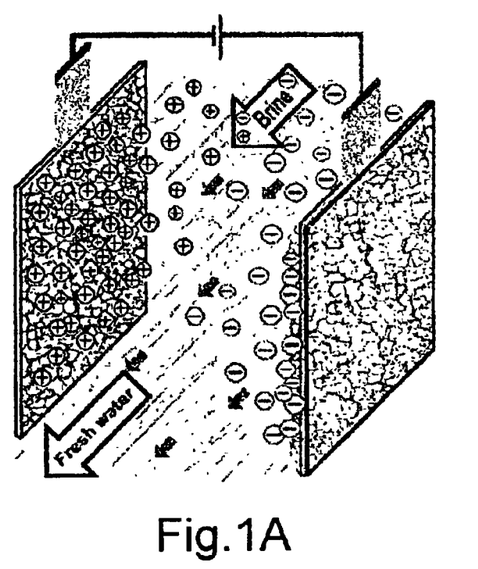
FIG. 1A is an illustration showing ions of a brine solution are adsorbed by a pair of coated plates, charged by a DC power source, as the fluid flowing through the plates in a preferred embodiment of the invention. The accumulation of charges on the plates is equivalent to the charging of an electrochemical capacitor.

Capacitor is deeply involved in human life from the integrated circuits that create the digital era, to the planet wherein human lives, for the earth is in essence a large spherical capacitor. In nature, charges are generated and cumulated in clouds from collisions between heavier ice pellets and lighter ice crystals, and the charges may be discharged in a fraction of a second which is often seen as lighting. Man-made capacitors are also capable of charging and discharging in less than a second. There are two kinds of capacitors, namely, electrostatic capacitor and electrochemical capacitor. An inorganic or organic electrolyte comprising a solvent and a soluble and dissociable salt is enclosed in the electrochemical capacitors to impart the capacitors high capacitance. When each of the two conducting plates of the electrochemical capacitor is connected to one terminal of a DC power source, it will instantly attain the same polarity and potential of that terminal. At the same time, the positively charged plate can attract the anions of the electrolyte, while the negative terminal of the capacitor attracts the cations. It is the adsorption of positive and negative ions, that is, cations and anions, on the surface of the capacitor plates or electrodes that constitutes the capacitance of the electrochemical capacitors. The process of charge accumulation through the application of a DC voltage to the plates of capacitors is the charging of capacitors. Depending on the values of capacitance and internal resistance of the capacitors, the charging times of capacitors may range from a fraction of a second to several seconds. FIG. 1A shows one preferred embodiment of the invention using two parallel plates coated with an adsorbent, indicated by the rough terrain, as two electrodes to form a capacitor. For the sake of clearance, no numerical number is assigned to the components in FIG. 1A, nor number is given to those in the following FIG. 1B. As shown in FIG. 1A, when the two conducting plates are connected to a DC power source represented by the symbol of battery, every up-and down tip of the rough terrain on the plates will instantly attain the same polarity but lower potential of that charged plate. In other words, there are numerous electro-statically attracting centers on each of the positively and negatively charged plates for adsorbing ions. As soon as a brine solution flows through the charged plates, the cations will be attracted by the negatively charged centers and the anions will be drown to the positive sites. Whereas the foregoing adsorption of ions on the surface of electrodes is the charging process of capacitor, the same process of FIG. 1A is deionization of the brine, as a result, the brine may become fresh water. Removal of ionic species from liquids by a method as FIG. 1A is named capacitive deionization (CDI).

It is known to people skilled in the art that the conducting plate employed in CDI is called substrate or current collector, while the adsorbent is active material. The substrate can be in the form of foil, plate, mesh, or web. Deionization or desalt is the principal goal of CDI, the technique only requires a low DC voltage, for example, 0.5–3V, so that electrolysis is inhibited. Furthermore, both current collectors and active material should be adsorptive, conductive, and inert in various harsh environments. If CDI is employed for desalination, titanium (Ti) is the best choice for the current collector in terms of resistance to salt corrosion and material cost. Nevertheless, platinum (Pt) and palladium (Pd) can be used as the substrate for the stringent applications such as hemodialysis. Because of their absorption capability, large specific surface area, and low cost, activated carbons (ACs) are the most convenient choice for the active material of CDI. There are numerous ACs available on the market that makes the selection of material laborious. In addition to cost, the chosen AC should have minimum surface area of 1000 $m^2/g$, minimum size of 200 mesh, and 0% ash content. Other costly carbonaceous materials such as the Bucky ball, $C_{60}$ and carbon nanotube can also be used at low loading. For mild and neutral liquids, metal oxides such as manganese oxide ($MnO_2$) and magnetite ($Fe_3O_4$) having specific adsorption so that the use of them is beneficial for special CDI applications. As the charging rate of capacitors is fast, CDI operations ought to be short for the surface of electrodes is quickly saturated with ion coverage. Under low operating voltage and short operating time, CDI is highly energy-efficient on reducing the TDS of liquids. It is estimated that CDI requires the consumption of energy no more than 1 KW/hr to desalinize 1 tonne (263 gallons) of 35,000 ppm seawater to 250 ppm fresh water. After treatment, the degree of purity of the fresh water in FIG. 1A is determined by the adsorption capability, and the effective surface area of the active material, as well as by the gap between the CDI electrodes.

Figure 1B:
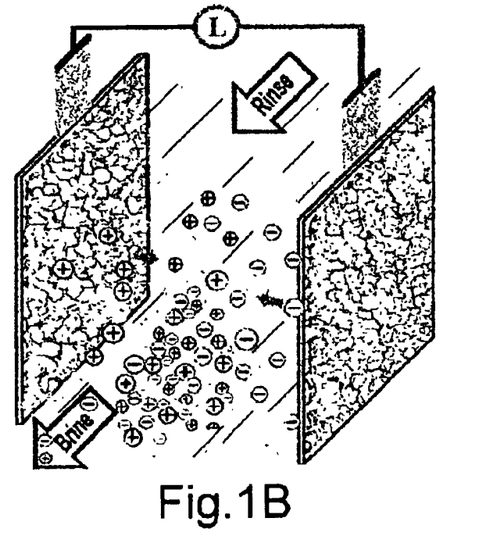
FIG. 1B is an illustration showing as the ion-covered plates are connected to a load, the ions are desorbed in correspondence to the discharging of electricity to the load in the preferred embodiment of the invention. Desorption of ions, which is equivalent to the discharging of an electrochemical capacitor, regenerates the surface of plates.

When the electrodes of FIG. 1A become saturated, they need regeneration, or desorption of ions, to resume adsorption capability. Just like the discharging of electrochemical capacitors leading to the returning of ions to the electrolyte, the saturated CDI electrodes can free their surface from ions by discharging to a load as shown in FIG. 1B. Three key features of the regeneration of CDI electrodes must be comprehended for the technique to be commercially viable in environmental applications and desalination. Firstly, regeneration of CDI electrodes can be and should be conducted as swiftly as the discharge of capacitors. Secondly, with discharge the adsorbed ions will automatically leave the CDI electrodes. Thus, any solution can be employed to transport the desorbed ions to a designated reservoir wherefrom useful resources can be concentrated and recovered. Only a small amount of rinse, as seen in FIG. 1B, in high purity is needed to clean the electrodes to minimize cross-contamination. Thirdly, the residual energy of the saturated CDI electrodes must be recovered and stored in a device for future use. It is estimated that more than 30% of the process energy applied during deionization can be recovered at regeneration.

The amount of energy available for recovery is often enormous and profitable. For example, a desalination plant of daily production of 30,000 tonnes (ca. 7,900,000 gallons) fresh water using CDI technology, will require 30,000 KWh of energy for deionization process, and there is 9000 KWh of the process energy can be reclaimed. To recover such huge energy immediately, supercapacitor, also known as ultracapacitor and electric double layer capacitor, is a far more effective energy-storage device than battery, inductor, or flywheel to do the job. This is because supercapacitors have high volumetric energy densities and they can be charged at electronic speed, accepting any magnitude of charging currents without generating heat or hysteresis. Based on a per unit size and weight basis, capacitive energy transfer is far more effective than the inductive energy transfer is. Spirally winding or closely stacking is generally used to manufacture capacitors. Some physical means are disposed between the electrodes to electrically isolate the electrodes. The CDI electrodes can adopt the same assembly fashion of conventional capacitors to form various modules to mate the desired housings in the liquid-treating systems. A CDI treating unit is thus constituted by the electrode module and its housing. Not only liquid leak is prevented in the unit, but also all the impure or un-treated liquid must flow through the electrostatic field built within the electrode module, and the impure liquid is prohibited from mixing with the treated liquid. Since CDI is operated under the ambient condition, the piping and connection for the desired fluid flows can be set up easily and maintained economically. However, energy recovery at the regeneration of CDI modules must be prompt and complete, cross-contamination form liquids must be low, and the layers of active material must remain effective for a long period of time, only then the operation cost of CDI can be as low as its material cost as depicted in the present invention.

Figure 2:
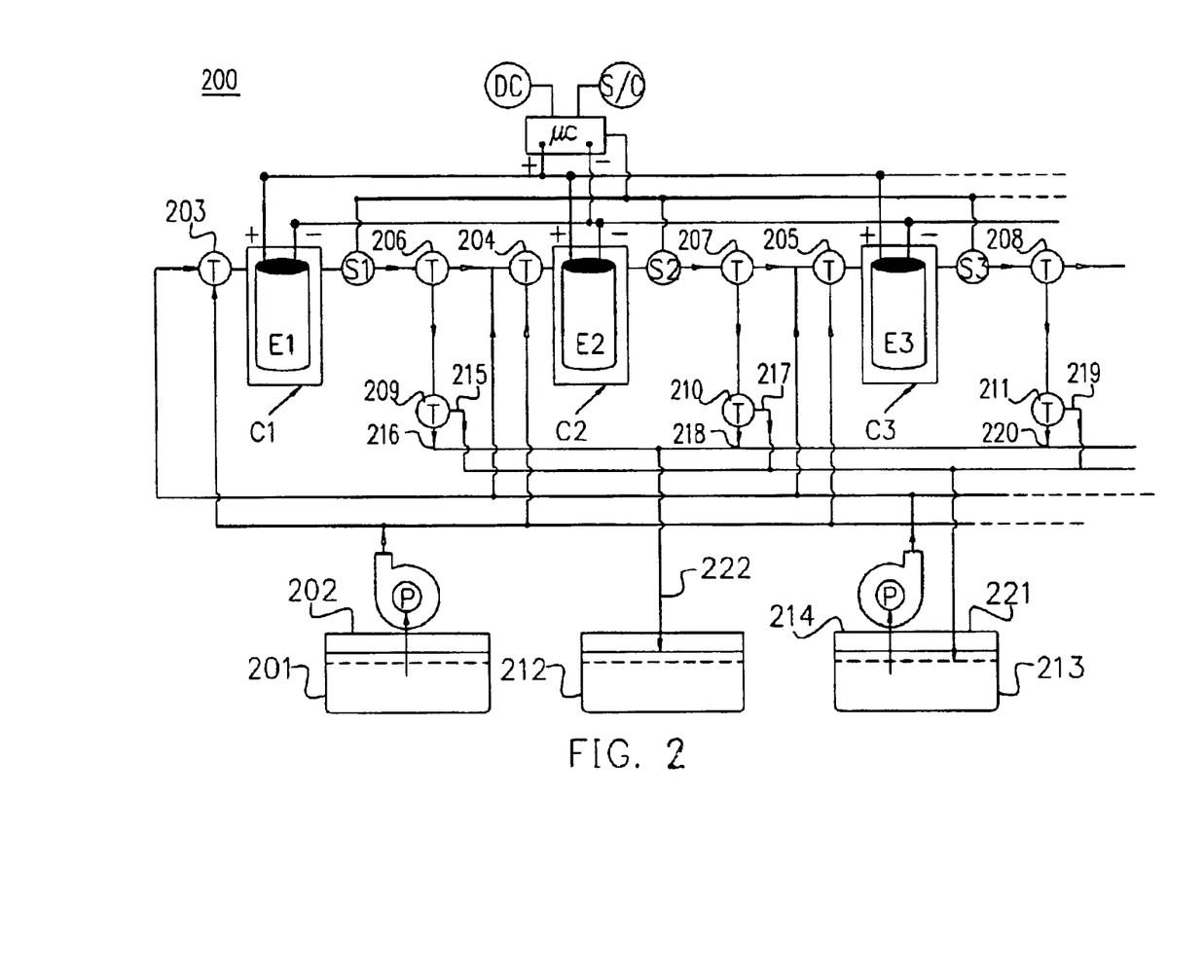
FIG. 2 is the principal scheme of a continuous flow and fully automatic CDI setup containing a tandem separator of three CDI treating units in the preferred embodiment of the invention.

One preferred embodiment of a fully automatic CDI system containing a tandem separator of three CDI treating units connected in series, designated as 200, is shown in FIG. 2. Only the major portions of the system are displayed in the drawing, and some detailed parts, as will be specified below, are omitted for clearance. There are five sub-systems to form a complete automatic CDI system, namely, 1) the electrode sub-system as indicated by E1, E2, and E3, 2) the CDI-treating-unit sub-system designated by C1, C2 and C3, 3) the energy-management sub-system constituted by micro-controller ($\mu$C), DC power source and supercapacitor (S/C), 4) the fluid-flow sub-system of fluid flow-pipes and connectors, and 5) the automatic control sub-system consisting of the micro-controller ($\mu$C), on-line sensors (S1, S2 and S3), and electromagnetic fluid-flow valves (T). Though only three CDI treating units are illustrated in FIG. 2, as many units arranged in any combination, in series or in parallel or combination thereof, can be disposed to form a CDI liquid-treating system as desired. Also, FIG. 2 is so simply constructed that the CDI electrode modules E1, E2, and E3 are shown in cylindrical shape, and their housings C1, C2 and C3 are of rectangle, while the electrode modules and the housings are not snuggly assembled. All of the foregoing is depicted for the sake of clearance.

In the operation of automatic CDI 200, an impure liquid such as seawater can be conveyed by pump 202 from tank 201 through electromagnetic fluid valve 203, 204 or 205 to the CDI treating unit C1, C2, or C3, respectively. As the impure liquid flows into the treating units, the micro-controller $\mu$C will synchronously direct the DC power source to supply electricity to the electrode module of that treating unit to perform deionization for a preset duration. The DC power source applies a DC voltage to the treating unit for a period from 30 seconds to 4 minutes for deionization. On the conclusion of a deionization session, the on-line sensors S1, S2 and S3 measure the conductivity, resistivity, pH, or optical absorbance of the effluent, in reference to a predetermined standard, to determine if the effluent is ready for harvest, or it requires further deionization treatment. If the effluent is pure according to the judgment, the sensor notifies the microprocessor $\mu$C to divert the electromagnetic flow valve 206, 207 or 208 to allow the pure liquid flowing through electromagnetic valve 209, 210 or 211, as well as through liquid pipe line 216, 218, or 220, respectively, to line 222 and into tank 212 to store for later use, or for transporting to a local water-supply system. There is a check value arranged on line 222 (not shown in FIG. 2) to prevent pure liquid back flow from the storage tank 212 back to the CDI treating unit (C1, C2, or C3). As long as the effluent is pure, more impure liquid can be conducted into that CDI treating unit (C1, C2, or C3) for deionization, otherwise, the influent will be switched from impure liquid (of tank 201) to the rinse supplied from tank 213 by the pumping of a pump 214. When the rinsing liquid flows to a CDI treating unit, the impure liquid flow to that unit will be terminated and all of the electromagnetic valves will be arranged, on the commands issued by the micro-controller $\mu$C, for the pass of rinsing liquid. Same as deionization, regeneration of the CDI electrode modules in the presence of rinsing liquid is also conducted for a pre-set duration, such as a duration less than one minute. On the conclusion of a regeneration session, the effluent of rinsing liquid, together with the desorbed ions, flows through pipe line 215, 217 or 219 into line 221 and back to the tank 213 wherefrom valuable ions can be concentrated and recycled for reuse, or collected as by-products for sale enhancing the value of CDI treatment.

Deionization of liquid and regeneration of the CDI electrode modules should be conducted simultaneously on separate groups of CDI treating units for two reasons. The first reason is that impure liquids in the industrial scale are frequently copious, the impure liquids should continuously flow through many parallel sets of CDI treating groups, each group containing a number of CDI treating units connected in series, to attain a high throughput. The second reason is that a tandem CDI treating units can facilitate the energy recovery at regenerating the electrode modules. More units connected in series, higher recovery rate and deeper discharge of each electrode modules can be attained. As the discharge of capacitors will cease when an equal potential is arrived, the serially connected capacitors can provide a larger potential range for discharge, thus a deeper discharge on each capacitor. While some groups of CDI units are subjected to regeneration, other groups will be performing deionization. Deionization and regeneration are quickly repeated and interchangeably among many groups of tandem CDI treating units. Therefore, fresh water and electricity are co-generated in the automatic CDI system of the present invention. In order to cope with the fluid flow rate, which is considerably slower than the electronic response, deionization and regeneration of CDI are accordingly set to appropriate durations of operation. The flow pattern through the whole CDI treating system can be programmed for any liquid flowing in any group of CDI treating units for any duration, arranged in any desired sequence of events.

Figure 3:
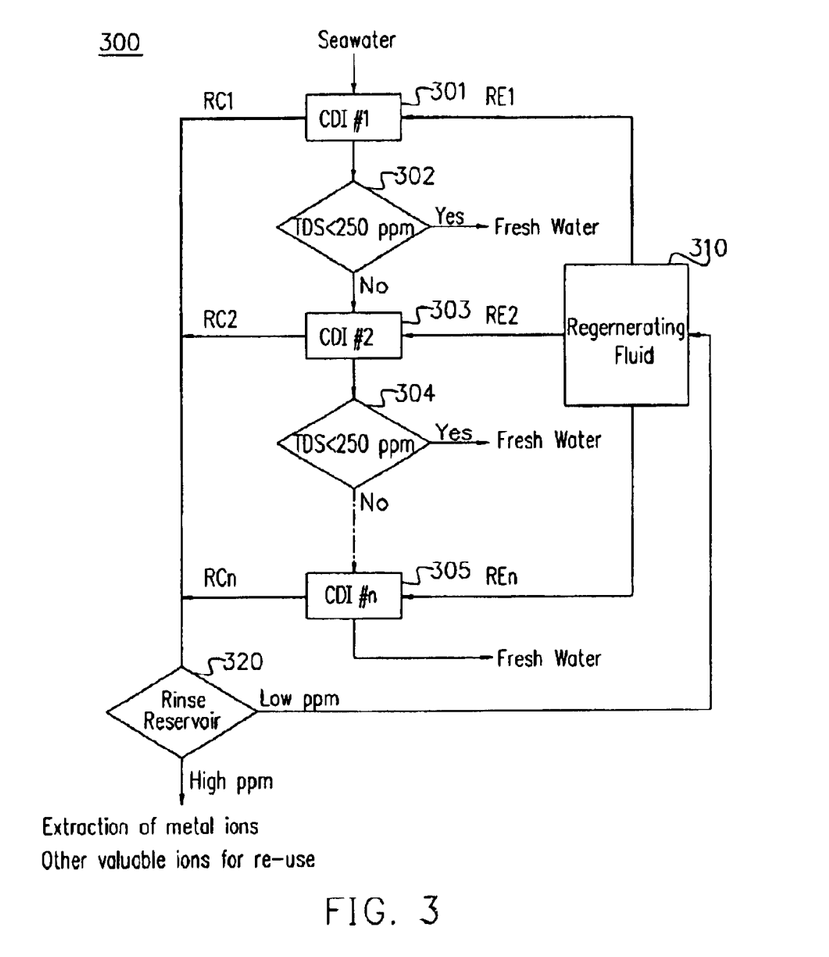
FIG. 3 is a flow chart of the operating logic of a fully automatic CDI system in the preferred embodiment of the invention, wherein seawater is used as an example.

To illustrate the operating logic of the invention, one preferred embodiment of process flow chart 300, using seawater as influent, is displayed in FIG. 3. After the deionization at CDI#1 of step 301, if the effluent is below 250 ppm at the determination of step 302, that effluent will be stored in the tank of fresh water. Otherwise, the effluent is sent to CDI#2 of step 303 for further deionization. Then, the next effluent is judged at step 304 for harvest, or for further deionization until CDI#n of step 305. On the other hand, when a CDI electrode module requires regeneration, a regenerating fluid will be injected from the tank 310, through pipe line RE1, RE2, or REn, to that module to perform regeneration with energy recovery (not shown in FIG. 3). On the conclusion of a regeneration session, the regenerating liquid exits that reset CDI treating unit through pipe line RC1, RC2, or RCn, into the rinse reservoir 320 wherein a decision is made, based on the ppm of liquid, for returning the liquid to tank 310 for reuse, or for transferring the concentrated liquid to a station for extraction of metal ions, for example, $Mg^{2+}$ in seawater, or for cycling other valuable ions for reuse or for sale.

To demonstrate the feasibility of the present invention, two examples are provided in the following.

EXAMPLE 1

Using Ti foils as current collector and a commercial activated carbon as active material, a cylindrical electrode module is constructed as that described in the pending U.S. patent application Ser. No 09/948,852, filed on Jul. 9, 2001. The activated carbon employed herein has a specific surface area of 1050 m$^2$/g, particle size of ca. 300 mesh, and it is sold at $0.35 per pound. The CDI electrode module prepared has a geometric area of 1140 cm$^2$ and it is placed in a standardized pressure vessel commonly used in commercial and residential water purifier systems. With 3V DC applied to the two terminals of the module, seawater of 34,000 ppm is continuously flowed through the cartridge for deionization at a constant flow rate of 1 l/min. During 4-minute deionization, 4 liters of the water has passed the electrode module under 3V, whereas the current has been observed to drop from 6A to 1A. The effluent is collected for 1 minute at 1-minute intervals, that is, four samples per run are attained, and TDS of the treated waters is measured. Four test runs are conducted with the electrode module reconditioned through energy recovery for each new run. The Reductions of TDS with one pass of 34,000 ppm seawater through the cylindrical CDI electrode module are listed in TABLE 1.

TABLE 1

| Sample # | Run # TDS (ppm) | | | | | Salt Rejection (%) |
|---|---|---|---|---|---|---|
| | 1 | 2 | 3 | 4 | Ave. | |
| I | 22,800 | 16,600 | 14,800 | 19,100 | 18,300 | 46.2 |
| II | 31,100 | 29,100 | 27,200 | 30,500 | 29,500 | 13.2 |
| III | 32,400 | 31,100 | 30,200 | 31,800 | 31,400 | 7.6 |
| IV | 32,400 | 31,800 | 34,500 | 32,400 | 32,800 | 3.5 |

Figure 4:
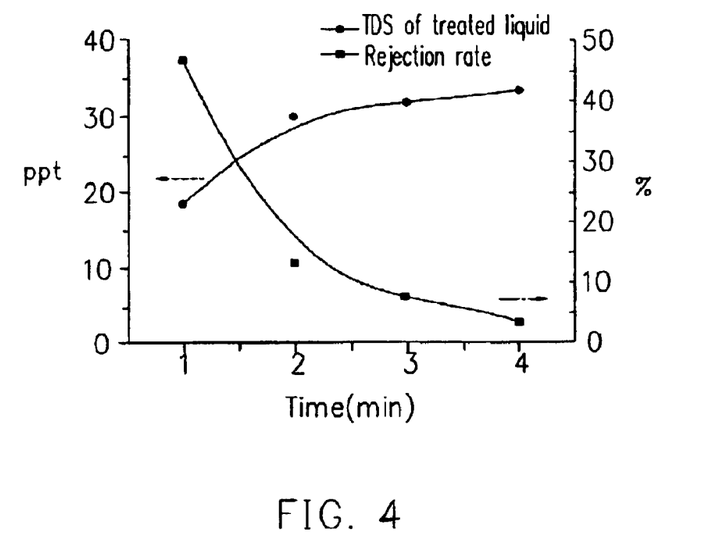
FIG. 4 is a plot showing the reduction of TDS and the change of salt rejection rate of a seawater sample subjected to a four-minute deionization in a CDI treating unit in the preferred embodiment of the invention.

Both TDS (in ppt) and salt rejection rate (%) are plotted against the collection time in FIG. 4. Since the liquid flow rate is 1 l/min, the abscissa also represents the volume of effluent in liter. As seen in the graph, TDS of the effluent rises quickly to the level of influent, whereas the salt rejection rate falls in correspondence to the change of TDS. Thus, the CDI electrode module becomes saturated rather quickly indicating that the deionization should be conducted in a short duration, most likely, less than 30 sec for a higher use efficiency of electrical energy. For commercial, industrial and residential applications, the geometric surface area of the electrode module, as well as the number of CDI treating units, can be custom-made to fulfill the desirable purity and productivity. At the application of 3V and 6A for 1 minute, the TDS of 1 liter un-diluted seawater is reduced by more than 40%. Electricity reclaimed from the process energy is stored in supercapacitors, which can drive toy cars for a lengthy time. Therefore, the speed of deionization, or charging rate, of the present invention is extremely fast, and the energy consumption is highly economical. Example 1 also indicates that the deionizer of the present invention can directly purify the un-diluted seawater without using any pre-treatment equipment, while the electrode modules can be reconditioned and reused repeatedly without damage and without adding chemicals, consuming energy, or generating secondary pollution. Furthermore, the deionizer of the invention can serve as a pre-treating equipment for concentration-sensitive, expensive and vulnerable ion-exchange and RO. While most charged contaminants are removed by the CDI treating units, trace ionic impurity is easy to be completely eliminated by ion-exchange or RO.

EXAMPLE 2

The same CDI treating system and operating voltage as EXAMPLE 1 is used for purifying an aqueous solution of $CuSO_4$ containing 2000 ppm $Cu^{2+}$. During 3-minute deionization, four samples of the effluent are collected for half minute at 30 seconds interval for the first minute, and 1 minute collection at 1 minute interval for the rest. TABLE 2 lists the TDS of treated solution.

TABLE 2

| # | TDS (ppm) | Rejection (%) |
|---|---|---|
| 1 | 1820 | 9 |
| 2 | 1930 | 3.5 |
| 3 | 1920 | 4 |
| 4 | 1900 | 5 |

Because $Cu^{2+}$ is prone to be reduced at the cathode resulting in the loss of active surface of the CDI electrode, the ejection rate in TABLE 2 is considerably lower than that in TABLE 1. For reducible ions, it requires modifications of the active material and the fluid flow pattern in the electrode module of the CDI treating systems utilized in the two examples.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fully automatic deionizer, comprising:
   at least one treating unit, comprising an electrode module and a housing, wherein the electrode module comprises at least one pair of anode and cathode made by coating an active material on an electrically conductive substrate;
   at least one DC power source to supply electricity to the electrode module for removing ionic species from liquids for deionization;
   at least one capacitor to store electricity extracted from the electrode module for desorbing the ionic species from the electrode module for regenerating the electrode module;
   at least one on-line sensor and at least one fluid valve for detecting and for diverting liquid flow in the treating unit; and
   at least one micro-controller for controlling the deionization, the electricity extraction from the electrode module, and the liquid flow.

2. The fully automatic deionizer of claim 1, wherein the active material is selected from a group consisting of activated carbon, $C_{60}$, carbon nanotube, $MnO_2$, $Fe_3O_4$ and combination thereof.

3. The fully automatic deionizer of claim 1, wherein the electrically conductive substrate is selected from a group consisting of Ti, Pt and Pd.

4. The fully automatic deionizer of claim 1, wherein the electrically conductive substrate is in the form of foil, plate, mesh, or web.

5. The fully automatic deionizer of claim 1, wherein the electrode module is in the form of cylinder, cube, or rectangle.

6. The fully automatic deionizer of claim 1, wherein the DC power source applies a DC voltage to the electrode module for a period from 30 seconds to 4 minutes for deionization.

7. The fully automatic deionizer of claim 6, wherein more than 30% of a process energy of the deionization is recovered from the electrode module.

8. The fully automatic deionizer of claim 1, which is designed so that electricity is extracted from the electrode module in less than one minute.

9. The fully automatic deionizer of claim 1, wherein a liquid is provided to transport the ionic species desorbed from the electrode module to a reservoir.

10. The fully automatic deionizer of claim 9, wherein the ionic species are stored in the reservoir to be concentrated for recycle, for recovery, or for disposal.

11. The fully automatic deionizer of claim 9, wherein the liquid is selected from a group consisting of fresh water, brine and seawater.

12. The fully automatic deionizer of claim 1, wherein the capacitor is selected from a group consisting of supercapacitor, ultracapacitor and electric double layer capacitor.

13. The fully automatic deionizer of claim 1, wherein the on-line sensor is used to on-line monitor conductivity, resistivity, pH, temperature, or optical absorbance of liquids.

14. The fully automatic deionizer of claim 1, wherein the fluid valve is actuated and controlled by electrical current.

15. The fully automatic deionizer of claim 1, comprising a plurality of treating units connected in series, a plurality of on-line sensors and a plurality of fluid valves, wherein at least one on-line sensor and at least one fluid valve are used for detecting and for diverting liquid flow in one treating unit.

16. A fully automatic deionizer, comprising:
at least two sets of treating units, wherein each set comprises at least one treating unit that comprises an electrode module and a housing, wherein the electrode module comprises at least one pair of anode and cathode made by coating an active material on an electrically conductive substrate;
at least one DC power source to supply electricity to the electrode modules for removing ionic species from liquids for deionization;
at least one capacitor to store electricity extracted from the electrode modules for desorbing the ionic species from the electrode modules for regenerating the electrode modules;
a plurality of on-line sensors and a plurality of fluid valves, wherein at least one on-line sensor and at least one fluid valve are used for detecting and for diverting liquid flow in one treating unit; and
at least one micro-controller for controlling the deionization, the electricity extraction from the electrode modules, and the liquid flow, wherein
a first set of treating units are switched to deionization and a second set to regeneration at one moment, while the first set of treating units are switched to regeneration and the second set to deionization at next moment.

17. The fully automatic deionizer of claim 16, wherein the active material is selected from a group consisting of activated carbon, $C_{60}$, carbon nanotube, $MnO_2$, $Fe_3O_4$ and combination thereof.

18. The fully automatic deionizer of claim 16, wherein the electrically conductive substrate is selected from a group consisting of Ti, Pt and Pd.

19. The fully automatic deionizer of claim 16, wherein the electrically conductive substrate is in the form of foil, plate, mesh, or web.

20. The fully automatic deionizer of claim 16, wherein the electrode module is in the form of cylinder, cube, or rectangle.

21. The fully automatic deionizer of claim 16, wherein the DC power source applies a DC voltage to the electrode module for a period from 30 seconds to 4 minutes for the deionization.

22. The fully automatic deionizer of claim 21, wherein more than 30% of a process energy of the deionization is recovered from the electrode modules.

23. The fully automatic deionizer of claim 16, which is designed so that electricity is extracted from the electrode modules in less than one minute.

24. The fully automatic deionizer of claim 16, wherein a liquid is provided to transport the ionic species desorbed from the electrode modules to a reservoir.

25. The fully automatic deionizer of claim 24, wherein the ionic species are stored in the reservoir to be concentrated for recycle, for recovery, or for disposal.

26. The fully automatic deionizer of claim 24, wherein the liquid is selected from a group consisting of fresh water, brine and seawater.

27. The fully automatic deionizer of claim 16, wherein the capacitor is selected from a group consisting of supercapacitor, ultracapacitor and electric double layer capacitor.

28. The fully automatic deionizer of claim 16, wherein the on-line sensors are used to on-line monitor conductivity, resistivity, pH, temperature, or optical absorbance of liquids.

29. The fully automatic deionizer of claim 16, wherein the fluid valves are actuated and controlled by electrical current.

30. The fully automatic deionizer of claim 16, wherein each set of treating units comprises a plurality of treating units that are connected in series, a plurality of on-line sensors and a plurality of fluid valves.

* * * * *